Feb. 6, 1951   L. S. BROWN   2,540,809
COMPENSATOR FOR SLIP IN VARIABLE FRICTION DRIVES
Filed Oct. 5, 1945   3 Sheets-Sheet 1

INVENTOR
LAWRENCE S. BROWN
ATTORNEY

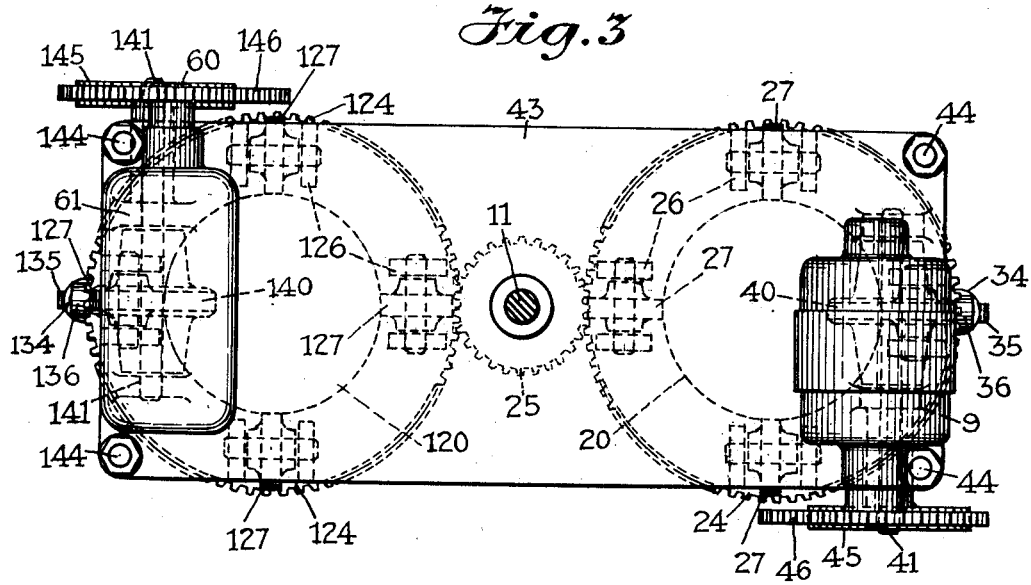
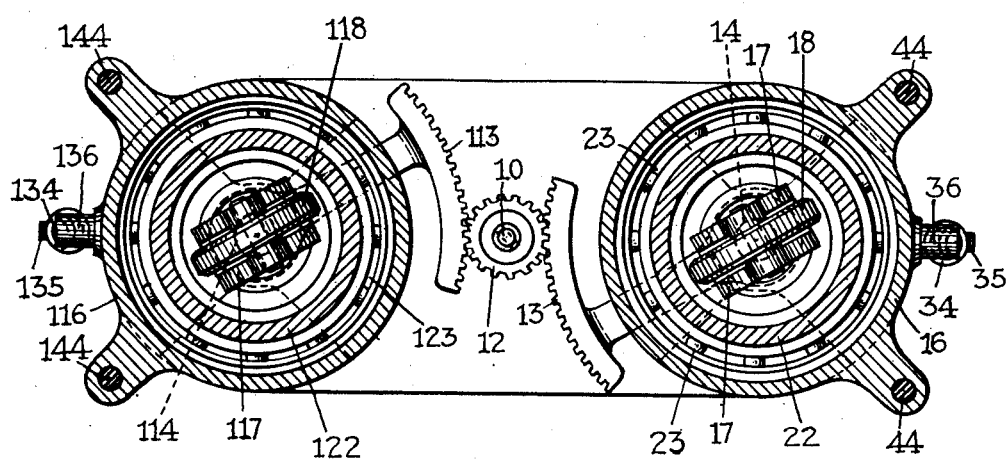

Patented Feb. 6, 1951

2,540,809

UNITED STATES PATENT OFFICE 2,540,809

COMPENSATOR FOR SLIP IN VARIABLE FRICTION DRIVES

Lawrence S. Brown, Long Island City, N. Y., assignor to The Sperry Corporation, a corporation of Delaware Application October 5, 1945, Serial No. 620,485

6 Claims. (Cl. 74—395)

This invention relates to variable speed drives of the type having a driving means in which the slippage is negligible at no load but increases as the transmitted torque increases and has for an object to provide means to compensate for such slippage under load so that the output rate accurately reflects the rate input setting.

Various other objects and advantages will be apparent as the nature of the invention is more fully disclosed.

The invention may be applied to a drive including a variable ratio power transmission of the mechanical or hydraulic type having a driving element, a rate setting element, and an output element which drives the power load. The output element also drives a second or pilot variable ratio transmission having a rate setting element which is connected to vary its ratio inversely as the ratio of the first transmission, so that, except for slippage in the first transmission its output would have a rate equal to that of the driving element of the first transmission. Means is provided to vary the input rate of the first transmission so as to maintain the output rate of the pilot transmission constant. Under these conditions the output rate of the first transmission is corrected for slippage.

In one embodiment the invention may be applied to a variable ratio transmission of the ball integrator type in which the torque is transmitted through a ball which is frictionally driven by a driving element and is connected to drive a driven element at a rate which is determined by the position of a rate setting element. In such a device there is a tendency for slippage to occur between the various elements and the ball, particularly if a substantial amount of power is being transmitted.

In accordance with the present invention, the effect of such slippage is eliminated by the use of a second variable ratio transmission mechanism which may be termed a pilot transmission and may be generally similar in construction to the first or power transmission although it may be considerably smaller as it is not required to transmit more than a small amount of power. The pilot transmission is connected to reverse the action of the power transmission so that its element corresponding to the driving element of the power transmission becomes its driven element and its element corresponding to the driven element of the power transmission becomes its driving element. The rate setting element of the pilot transmission is connected to be positioned simultaneously with the rate setting element of the power transmission and its driving element is connected to be driven by the driven element of the power transmission.

The rate of the driven element of the pilot transmission is arranged to be compared with the desired rate of drive of the input of the power transmission, for example, a constant speed such as may be derived from a clockwork mechanism. The clockwork mechanism is arranged by suitable control to vary the rate of the driving element of the power transmission so as to maintain the driven element of the pilot transmission at the desired rate.

The arrangement is such that with no slippage of the parts the driving element of the power transmission and the driven element of the pilot transmission will operate at the same rate. If slippage occurs, however, the driving element of the power transmission is caused to operate at a sufficiently higher rate to compensate for the effect of slippage and to maintain the driven element at its desired rate. By this method the driven element of the power transmission is operative at its correct rate regardless of any slippage in the power transmission.

The invention is applicable to various types of variable speed drives and is shown for purposes of illustration only as applied to a drive including a variable ratio transmission of the frictionally-driven ball-integrator type.

Although the novel features which are believed to be characteristic of this invention are pointed out more particularly in the claims, the nature of the invention will be better understood by referring to the following description, taken in connection with the accompanying drawings, in which a specific embodiment thereof has been set forth for purposes of illustration.

In the drawings:

Fig. 3 is a top plan view thereof; and

Fig. 4 is a horizontal section taken on the line 4—4 of Fig. 1.

Figure 1:
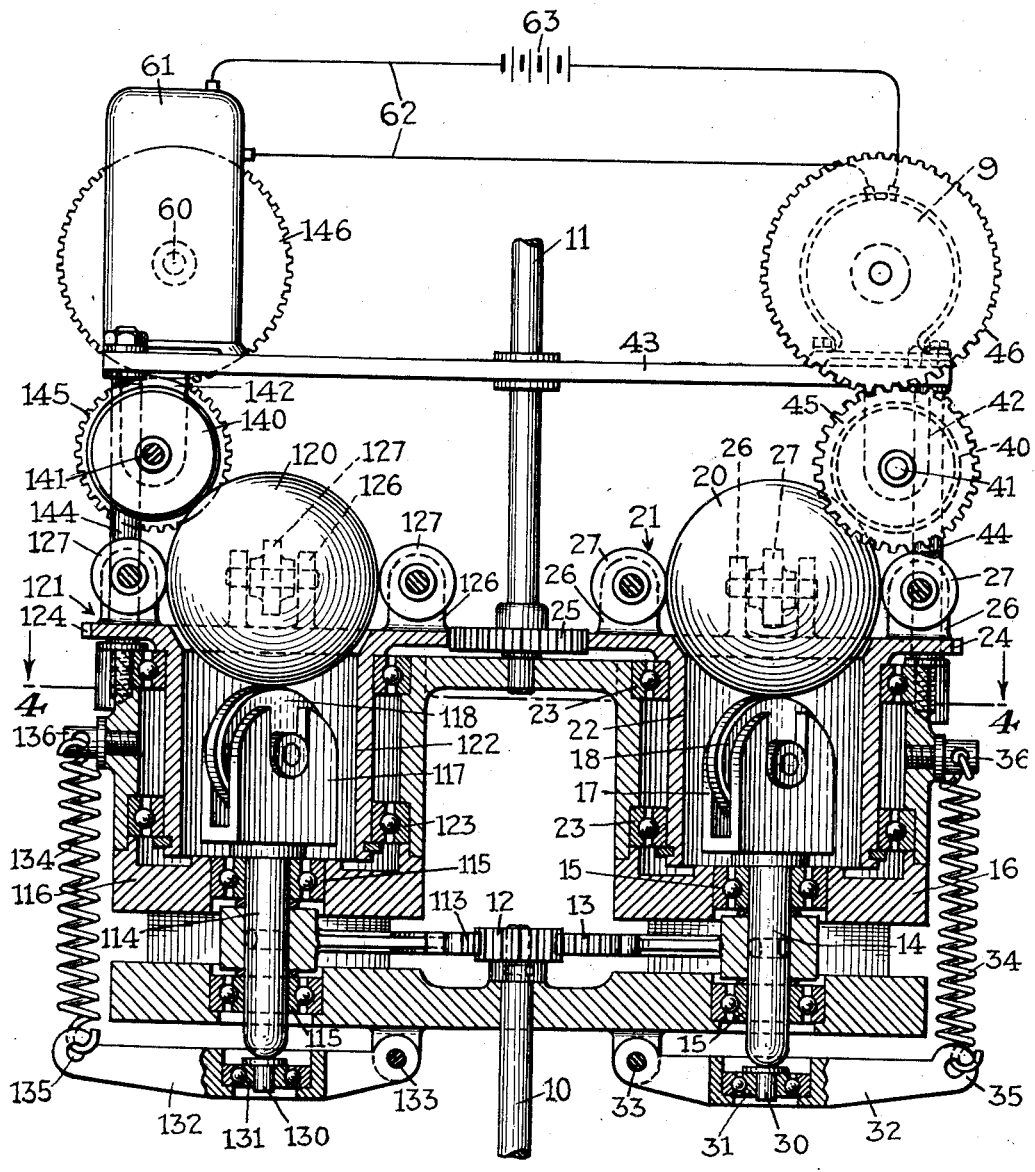
Fig. 1 is a side elevation, partly in section of a variable speed drive embodying the present invention.

Referring to the drawings more in detail, the variable speed drive is shown comprising a rate input shaft 10, and an output shaft 11 which is driven by a motor 9 through a variable ratio transmission to be described. The angular position of the input shaft 10 controls the ratio of the transmission and hence the rate at which the output shaft 11 is to be driven.

The input shaft 10 is provided with a pinion 12 which meshes with a segment gear 13. The gear 13 is pinned to a shaft 14 which is journaled in bearings 15 in a stationary housing 16 of any suitable type, and carries at its upper end a bracket 17 in which a steering roller 18 is mounted for rotation about a transverse axis. The steering roller 18 engages a ball 20 which is freely rotatable in all directions. The ball 20 is held in a cage 21 having a hub 22 which is journaled for rotation about an axis concentric with the shaft 14 by means of ball bearings 23 and is provided with teeth 24 meshing with pinion 25 attached to the output shaft 11. The cage 21 carries a plurality of brackets 26 in which rollers 27 are supported for rotation about axes which are normal to a radius of the ball 20 passing through the points of contact of the surface of the ball with the respective rollers 27. The steering roller 18 is held in frictional engagement with the ball 20 by means of a thrust bearing comprising a shouldered stud 30 journaled for rotation about the axis of the shaft 14 by means of a ball bearing 31 mounted in an arm 32. The stud 30 has a surface bearing against the lower end of the shaft 14. The arm 32 is pivoted to the housing 16 by a pin 33 and is held in pressure engagement with shaft 14 by means of a spring 34 which is connected between an ear 35 formed on the end of the arm 32 and an ear 36 attached to the housing 16.

Figure 2:
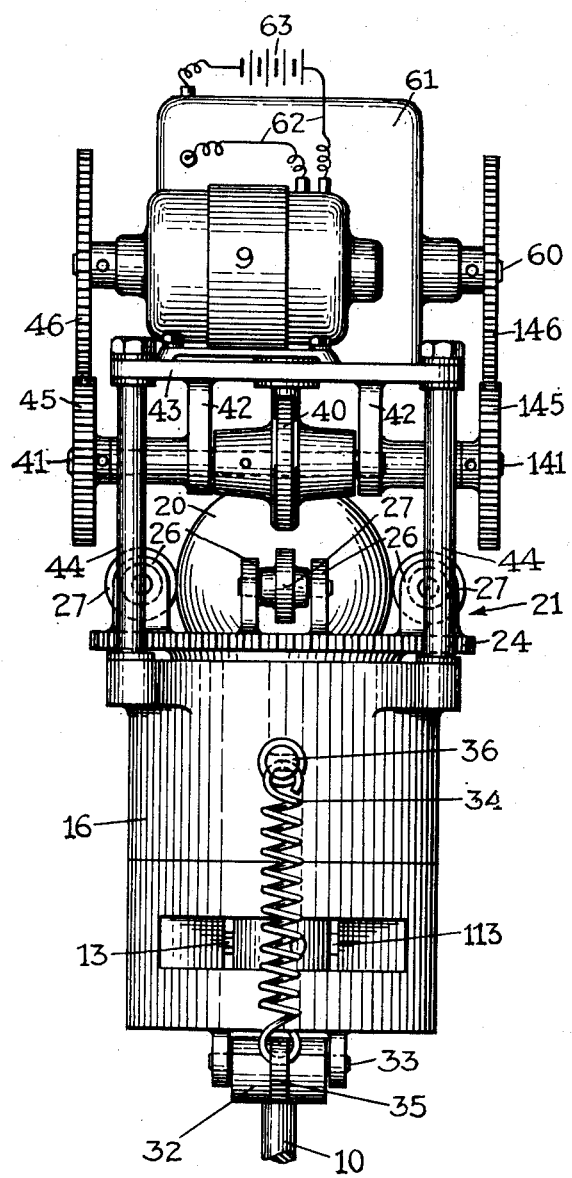
Fig. 2 is an end elevation thereof.

The ball 20 is frictionally driven by means of a driving roller 40 which is mounted on a shaft 41 (Fig. 2) secured in brackets 42 attached to a plate 43 which is supported by means of posts 44 from the housing 16. The shaft 41 carries a gear 45 meshing with a gear 46 which is driven by the motor 9. The motor 9 is attached to the supporting plate 43.

The arrangement of the variable speed drive thus far described is such that with the motor 9 operating at a constant speed, the driving roller 40 is driven at a constant speed and frictionally drives the ball 20 about an axis which is determined by the relative positions of the axes of the driving roller 40 and of the steering roller 18. When the axes of the driving roller 40 and the steering roller 18 are in any position except parallel, the axis of rotation of the ball 20 will be such that there is a component of the rotation about the vertical axis of the cage 21. This component causes the cage 21 to rotate about its axis at a rate which is a function of the angular displacement of the axis of the steering roller 18 from a position parallel to the axis of the driving roller 40, as more fully set forth in an application of W. H. Newell Patent No. 2,412,468, dated December 10, 1946, for Variable Speed Device.

The rate of rotation of the cage 21 is transferred to the output shaft 11 and the latter is caused to rotate at a rate which is determined by the angular position of the axis of the steering roller 18, which in turn is determined by the position of the input shaft 10. The rate of the output shaft 11, however, may have an error which is a function of the slippage of the frictional driving elements above described. In order to eliminate this error, a second or pilot variable ratio transmission is used.

In the form shown this pilot transmission is similar in construction to the power transmission above described. To avoid duplicating the description, the elements of the pilot transmission corresponding to those of the power transmission are given the same reference characters increased by 100. In this pilot transmission, however, the gear 146 instead of being connected to a driving motor is connected to a shaft 60 forming a part of a constant speed control device 61. The constant speed control device may be of any suitable type which is adapted to maintain a shaft operating at a constant speed and may, for example, be of the type disclosed more in detail in Ford Patent No. 1,577,618 dated March 23, 1926 for Speed Regulating Mechanism. This patent discloses a clockwork mechanism having a constant speed element driving one side of a differential the other side of which in the present case would be driven by the shaft 60. The differential cage is arranged to close electrical contacts when the speed of the shaft 60 falls below the standard speed and to open said contacts when the speed of shaft 60 exceeds the standard speed. In the embodiment shown herein these contacts are connected by conductors 62 through a source of power shown as a battery 63 to drive the motor 9 so that it is alternately energized and de-energized in accordance with the position of the control contacts in the clockwork mechanism 61. The motor 9 normally has a speed above the standard speed, that is, the speed of the constant speed element of the speed control device 61, and is energized intermittently by the closing of the contacts at a frequency determined by the amount of slippage, so that the summation of the intermittent relatively rapid movements of control speed shaft 60 drives one side of the differential at the same rate as the other side is driven by the constant speed element. It is to be understood, however, that the clockwork mechanism is merely representative and that other suitable mechanism which will control the speed of shaft 60 may be employed for the same purpose. In any event, the arrangement is such that the motor 9 is controlled in a manner to maintain the shaft 60 at a controlled speed.

In the above described mechanism, the pilot transmission receives its driving force from the pinion 25 attached to the output shaft 11. Hence the cage 121 of the pilot transmission is driven at the same rate as the cage 21 of the power transmission. Likewise, the steering roller 118 of the pilot transmission is positioned with its axis parallel to the axis of the steering roller 18 of the power transmission. Hence, the ball 120 of the pilot transmission, except for slippage in the power transmission, is driven by the cage 121 at the same rate as the ball 20 of the power transmission. The roller 140 will similarly be driven by the ball 120 at a rate comparable to that of the driving roller 40 and the shaft 60 will operate at the rate of the motor 9, except for slippage. When slippage occurs in the power transmission shaft 60 rotates at a rate which is less than the rate of the motor 9 by the amount of such slippage. In order to eliminate this effect from the rate of the output shaft 11, the speed control mechanism above described is connected so as to cause the motor 9 to operate at a speed such that the shaft 60 is maintained at the desired speed. The motor 9 is thus made to operate at a speed which is sufficiently in excess of its normal speed to compensate for the effect of slippage. Hence the speed of the output shaft 11 is a true function of the angular position of the input shaft 10. It will be noted that because of the inverse operation of the pilot transmission the speed of the output shaft 11 cannot be brought to zero.

It is to be understood, of course, that a variable ratio transmission of the ball integrator type has been shown for purposes of illustration only. The power transmission may comprise any form of frictionally or hydraulically driven variable ratio transmission or any other form of variable ratio transmission in which the output speed may not be exactly in accord with the rate setting. The pilot transmission may be of the same type as the power transmission or of another type and smaller than the power transmission.

Although a specific embodiment of the invention has been shown for purposes of illustration, it is to be understood that the invention is not to be restricted thereto, but may be applied to various uses and that various adaptations may be made therein as will be apparent to a person skilled in the art. The invention is only to be restricted in accordance with the scope of the following claims.

What is claimed is:

1. A variable speed drive comprising a rate input shaft positionable to represent a rate, a variable ratio transmission comprising a driving means, an output member, and means positioned by said rate input shaft to vary the transmission ratio of said transmission for controlling the rate of said output member, a second variable ratio transmission having input and output members, means connecting the last mentioned input member to be driven with said first mentioned output member, means positioned by said rate input shaft to vary the transmission ratio of the second transmission inversely as the ratio of said first transmission, a control mechanism actuated by the output member of said second transmission, and means responsive to the control mechanism to control the rate of said driving means.

2. A variable speed drive comprising a rate input shaft positionable to represent a rate, a variable ratio transmission comprising a driving means, an output member, and means positioned by said rate input shaft to vary the transmission ratio of said transmission for controlling the rate of drive of said output member, a second variable ratio transmission having input and output members, means connecting the last mentioned input member to be driven with said first mentioned output member, means positioned by said rate input shaft to vary the transmission ratio of the second transmission inversely as the ratio of said first transmission, a control member driven by the output member of said second transmission, a speed control device, means comparing the rate of said control member with said speed control device, and means responsive to said comparing means to control the rate of said driving means in a sense to maintain the rate of said control member equal to that of the speed control device.

3. A variable speed drive comprising a rate input shaft positionable to represent a rate, a variable ratio transmission comprising a driving roller, a ball driven thereby, an output member driven by said ball, and control means positioned by said rate input shaft to vary the ratio of drive of said transmission, and a second variable ratio transmission having a roller, ball, and input member in driving relationship and a ratio control means, means connecting the last mentioned input member to be driven with said first mentioned output member, means positioning the ratio control means of said second transmission to cause the second transmission to have a transmission ratio inverse to the ratio of said first transmission, a control member driven by the roller of said second transmission, and means responsive to variations in rate of said control member to control the rate of said driving roller in a sense to maintain the rate of said control member constant.

4. A variable speed drive comprising a rate input shaft positionable to represent a rate, a variable ratio transmission comprising a driving roller, a ball driven thereby, an output member driven by said ball, and ratio control means positioned by said rate input shaft to vary the ratio of drive of said transmission, and a second variable ratio transmission having a roller, ball, and input member in driving relationship and a ratio control means, means connecting the last mentioned input member to be driven with said first mentioned output member, means positioning the ratio control means of said second transmission to cause the latter to have a ratio inverse to that of said first transmission, a control member driven by the roller of said second transmission, a constant speed device, means comparing the rate of said control member with said constant speed device, and means responsive to said comparing means to control the rate of said driving means in a sense to maintain the rate of said control member equal to that of the constant speed device.

5. A variable speed drive comprising a rate input shaft positionable to represent a rate, a variable ratio transmission comprising a driving roller, a ball driven thereby, an output member driven by said ball, and a steering roller in driving contact therewith, means positioning said steering roller by said rate input shaft to vary the drive ratio of said transmission, and a second variable speed transmission having a steering roller, a ball, an input member driving said ball, and a roller driven by said ball, means connecting the last mentioned input member to be driven with said first mentioned output member, means positioning said steering roller by said rate input shaft so as to cause the transmission ratio of said second transmission to vary inversely as that of said first transmission, a control member driven by said driven roller of said second integrator, and means responsive to variations in the rate of said control member to control the rate of said driving roller in a sense to maintain the rate of said control member constant.

6. A variable speed drive comprising a rate input shaft positionable to represent a rate, a variable ratio transmission comprising a driving roller, a ball driven thereby, an output member driven by said ball, and a steering roller for said ball, means positioning said steering roller by said rate input shaft to vary the drive ratio of said transmission, and a second variable ratio transmission having a steering roller, a ball, an input member driving said ball, and a roller driven by said ball, means connecting the last mentioned input member to be driven with said first mentioned output member, means positioning said last steering roller by said rate input shaft in a manner such that the transmission ratio of said second transmission varies inversely with that of said first transmission, a control member driven by said driven roller of said second transmission, a speed control mechanism, means comparing the rate of said control member with the rate of said speed control mechanism, and means responsive to variations in the compared rate to control the rate of said driving roller in a sense to maintain the rate of said control member in accord with the rate of said speed control mechanism.

LAWRENCE S. BROWN.

REFERENCES CITED

The following references are of record in the file of this patent:

UNITED STATES PATENTS

| Number | Name | Date |
|---|---|---|
| 1,577,618 | Ford | Mar. 23, 1926 |
| 1,993,983 | Woodard | Mar. 12, 1935 |
| 2,308,090 | McFarren | Jan. 12, 1943 |
| 2,412,468 | Newell | Dec. 10, 1946 |